…

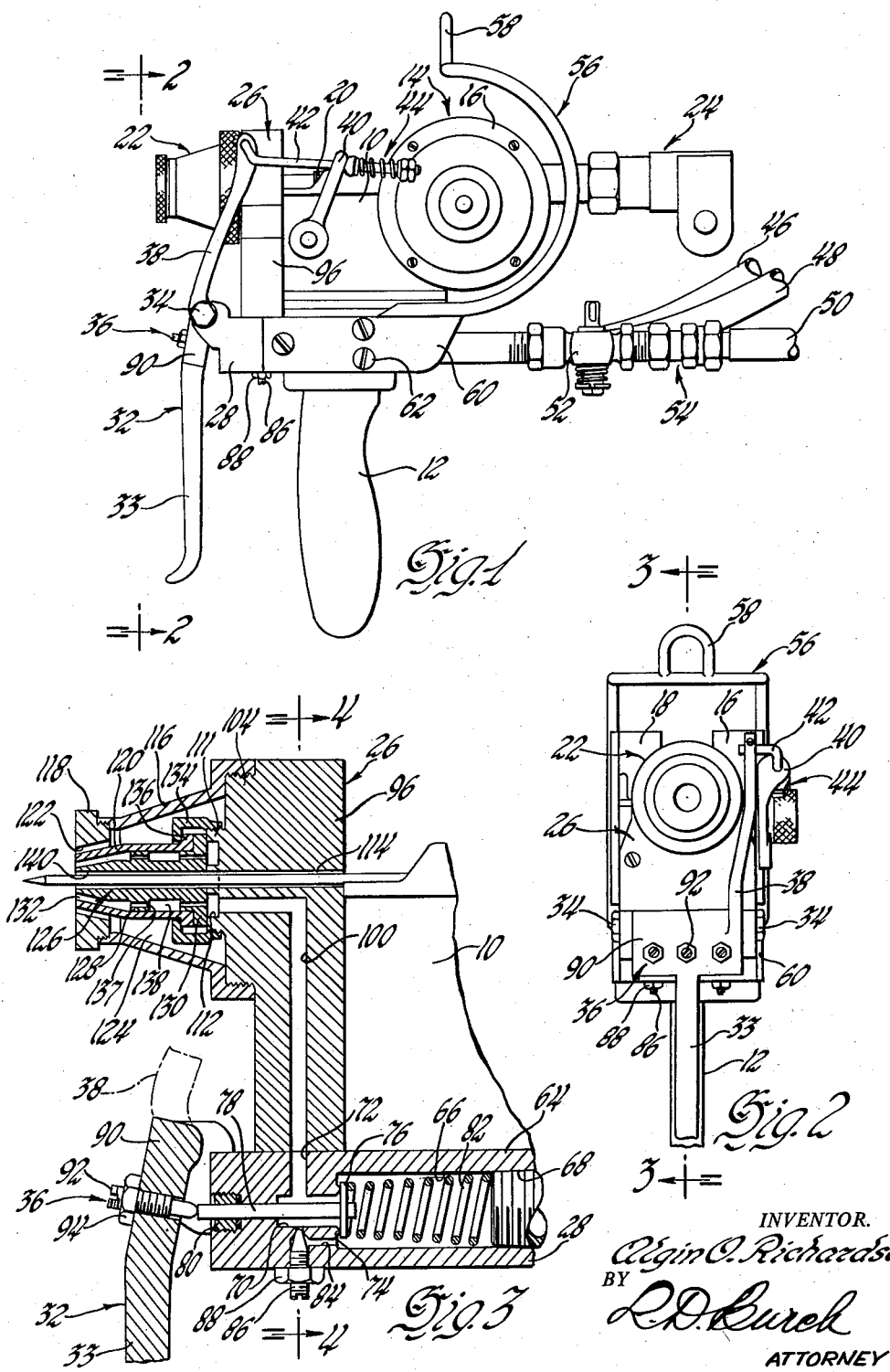

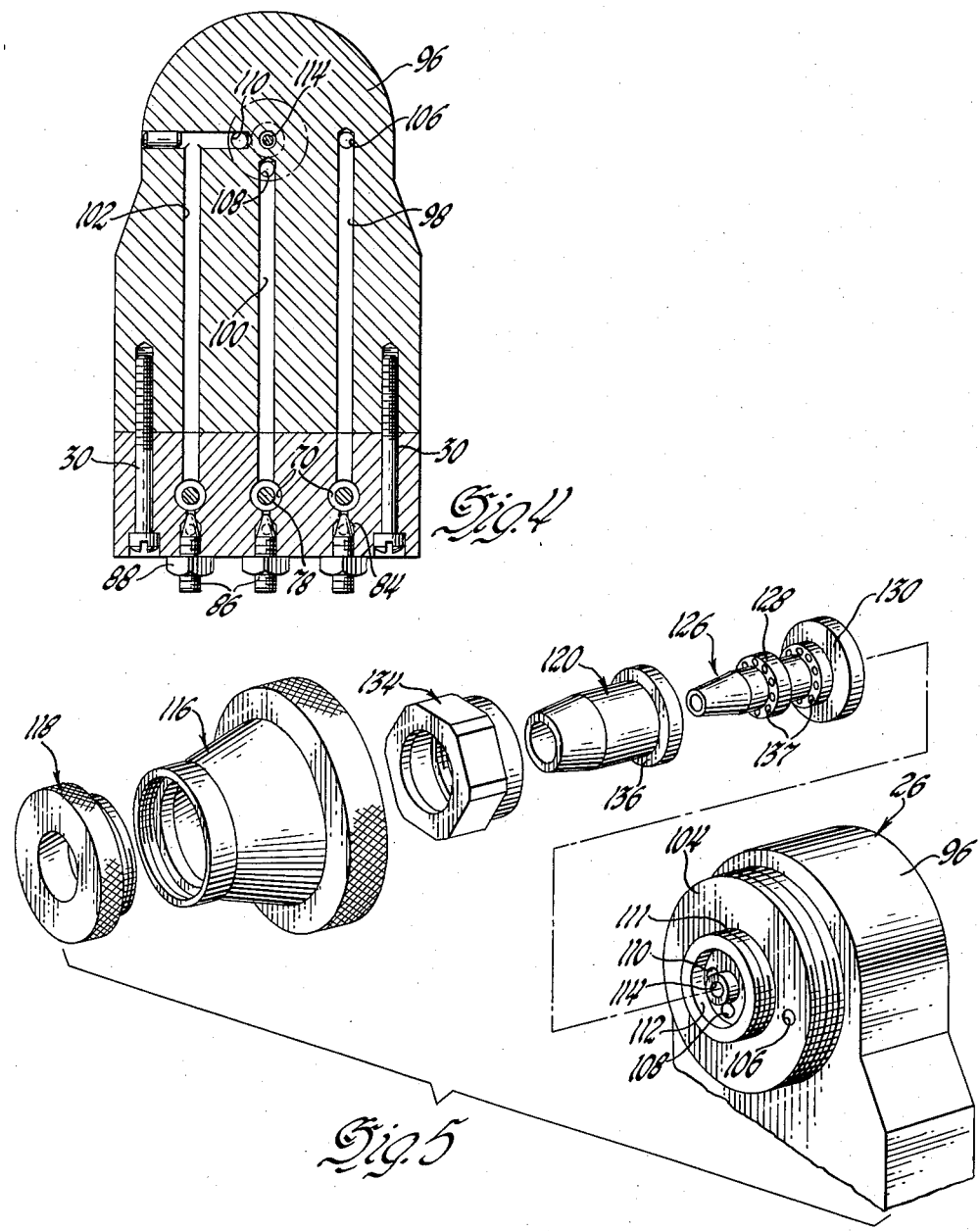

United States Patent Office 2,982,479
Patented May 2, 1961

2,982,479
SOLDER SPRAY GUN IMPROVEMENTS

Algin O. Richardson, Raytown, Mo., assignor to General Motors Corporation, Detroit, Mich., a corporation of Delaware Filed Oct. 2, 1958, Ser. No. 764,849

2 Claims. (Cl. 239—84)

This invention relates to solder spray guns and more particularly to improvements in the nozzle and valving systems for solder spray guns.

Solder spray guns have a great deal of applications in various industries. The generally available tool provides a means for spraying liquid solder onto a workpiece, the solder being fed into the tool in the form of a wire or ribbon. A readily ignitable gas is used to melt the solder as it passes through the gas nozzle and an air spray blows the liquid solder onto the workpiece.

The generally available solder spray gun, however, has a great many disadvantages in production usage. Most solder spray guns have a clutch assembly which feeds the solder through the gas nozzle, making it necessary for the operator to hold the tool in one hand and operate the clutch lever with the other hand. This requires him to stop spraying in order to maneuver the workpiece, when necessary. The general solder spray gun has no pilot provision for the gas flame, which means that each time the tool is used the gas must be turned on and then ignited, the nozzle preheated to a suitable solder melting temperature before it can be used to spray solder. A further disadvantage is the lack of valve sequencing, or a lack of means by which the various gases and the air are passed to the nozzle. As such, it is difficult to ignite the gas since the air may be blowing at the same time, extinguishing the spark or flame with which the gas is to be ignited. Another disadvantage is a lack of adequate pre-mixing of the gas prior to ignition at the nozzle tip. This leaves an uneven flame and consequent uneven melting and distribution of the solder. In most spray guns the nozzle tip is formed of a plurality of converging jets for the gas, and a concentric outer series of jets for the air spray, with the solder wire passing through the center of the nozzle. It is obvious that the solder will be melted from the outside in and, at those places on the periphery of the solder wire between the jets of the nozzle, the solder will not be melted at all. Consequently, particles of solder are sprayed to the workpiece by the air, resulting in uneven distribution and unworkmanlike operations.

The devices in which this invention is embodied comprise a much improved gas and air nozzle and a suitable valve block and valve system that makes the tool adaptable to a wide variety of uses. A pilot provision is made in the valve block such that the gas and air will not be completely turned off in between the operations, allowing a flame to be kept at the nozzle tip to maintain suitable nozzle preheat. The valve block is provided with a trigger, which is also connected to the clutch lever, allowing the operator to manipulate and operate the tool with one hand leaving the other hand free for maneuvering the workpiece. The valve sequence is adjustable to provide for a proper operational sequence of the gas flow and the air flow. Mixing chambers are provided in the nozzle to provide a better gas mixture in the nozzle tip, which increases the efficiency of the flame. Annular orifices in the nozzle tip, instead of the spaced jets, provide even solder melting and even distribution of the solder on the workpiece. It may be seen, therefore, that the improved tool provides a much better and more efficient operation.

In the drawings:

Figure 1 is an elevational view of a solder spray gun in which the invention is embodied.

Figure 2 is an end view of the solder spray gun of Figure 1 taken substantially along the line 2—2 and looking in the direction of the arrows.

Figure 3 is an enlarged view of the solder spray gun of Figures 1 and 2 with parts broken away and in section and taken substantially along the line 3—3 of Figure 2.

Figure 4 is a view of a portion of the device shown in Figure 3 taken substantially along the line 4—4 and looking in the direction of the arrows.

Figure 5 is an exploded view in perspective of the nozzle assembly.

Referring more particularly to the drawings, Figures 1 and 2 illustrate the entire solder spray gun. The gun consists generally of a body portion 10 which has a handle 12 and a solder feed mechanism 14. This mechanism may be of any well known type and is illustrated as a pair of air turbines 16 and 18, which are rotated by air pressure, to drive a pair of knurled wheels 20 to feed the solder through the nozzle structure, illustrated generally by the numeral 22. A solder guide assembly 24 feeds the solder at the correct angle to the feed wheels 20. A nozzle block 26 is secured to the body 10 in any suitable manner and supports the nozzle assembly 22.

A valve block 28 is secured to the body 10 and to the nozzle block 26, as by bolts 30, and has a plurality of passages therein which communicate with passages in the nozzle block. A trigger assembly 32 is pivoted to the valve block 28, as by the bolts 34, and carries the valve adjusting means, illustrated generally by the numeral 36, which will be later described. The upper portion 38 of the trigger assembly is linked to the clutch lever 40 by the link arm 42. The clutch lever actuates the driving wheels 20 to feed the solder through the nozzle 22. A spring assembly 44, secured to the rear end of the link 42, allows gas to be fed to the nozzle before the solder feed clutch lever 40 is actuated, allowing a proper preheat for the nozzle 22. A plurality of conduits extend into the valve block, consisting of an oxygen conduit 46, a gas conduit 48, which may feed a suitable gas such as acetylene or propane, and an air conduit 50. The air conduit may have a valve 52 therein adjacent the tool and similar valves may be provided in the conduit 46 and 48. However, the oxygen and gas are commercially available in bottles having suitable valves located thereon, eliminating the necessity for valves in the conduits 46 and 48. Suitable connecting members 54 are provided in the air conduits 50 to connect the conduit to the valve 52.

A hanger assembly, consisting of a curved rod 56 having a loop 58 therein, is secured to the valve block by the plates 60 connected to the ends of the rod, the plates being secured to the valve block by screws or the like, 62. The tool may thus be placed on an overhanging hook to keep the tool handy to the operator when not in use.

The valve block, which constitutes one of the improvements in an existing solder spray gun, is best shown in Figure 3 and consists of a body 64 having a plurality of inlet chambers 66 therein. In the particular instance illustrated there would be three alike inlet chambers 66 to accommodate gas, oxygen and air being fed in by the conduits 46, 48 and 50. The conduits may be connected to the valve block in any conventional manner and are shown here as threadedly received at 68 in the chamber 66. The chamber 66 communicates with a second smaller chamber 70 which forms the connection for the outlet passage 72. The passage 72 feeds directly to the nozzle block 26 and communicates with suitable passages therein. Between the chamber 66 and the secondary chamber 70 is a valve seat 74, to accommodate the valve member 76 secured to the end of the valve rod 78. The valve rod extends through a bushing 80 in the valve block body 64. A spring 82 within the chamber 66 bears against the valve member 76 to bias the valve member in a closed position.

A passage 84 extends between the chamber 66 and the secondary chamber 70, to allow a bypass of fluid around the valve member 76 from chamber 66 to the secondary chamber 70 and to the outlet passage 72. This provides for a suitable pilot at the nozzle tip, which will be later described. A bolt member 86, which may be tightened by the nut 88 extends into the passage 84 to regulate the amount of fluid passing through the pilot passage 84.

The trigger assembly 32 consists of a lower arm 33 and an upper arm 38. Disposed between the two arms is a plate structure 90 which carries the valve adjusting means. The valve adjusting means consists of a bolt 92 and a lock nut 94. The bolt 92 bears against the projecting end of the valve rod 78, and it may be seen that as the lower arm 33 of the trigger assembly is moved toward the handle, the bolt member 92 will force the valve rod 78 and the valve member 76 into the chamber 66 against the force of the spring 82. The passage between the chamber 66 and the outlet passage 72 will then be open, allowing the flow of gas therethrough.

The nozzle block 26, best shown in Figures 3 and 4, comprises a body portion 96 through which are a plurality of passages 98, 100 and 102. These passages are aligned and communicate with the outlet passage 72 in the valve block to convey gas, air, or oxygen from the respective inlet chambers 66 to the nozzle 22. A second air passage, not shown, is provided through the nozzle block to accommodate the air turbines 16 and 18. A boss 104 is provided on one face of the nozzle block to receive the nozzle assembly 22. The air, gas and oxygen passages communicate with the nozzle structure through the boss 104, through an air outlet 106, a gas outlet 108, and an oxygen outlet 110, as seen in Figure 5. A second projection 111 on the nozzle block, and on the face of the boss 104, has an annular groove 112 formed therein to serve as a mixing chamber for the gas and the oxygen entering from outlets 108 and 110. A passage 114 through the nozzle block receives the solder wire from the solder feed assembly.

The nozzle structure 22 is best illustrated in Figures 3 and 5. An outer cone 116 is threadedly received on the boss 104 and has the nozzle tip 118 secured thereto. An intermediate cone 120 is concentrically disposed within the outer cone 116, and within the nozzle tip 118, to provide an annular orifice 122 between the intermediate cone 120 and the nozzle tip 118. An air chamber 124 is defined between the outer cone 116 and the intermediate cone 120 which communicates directly with the air outlet 106.

An inner cone member 126 is concentrically disposed within the intermediate cone 120 and spaced therefrom by flanges 128 and 130. A second annular orifice 132 is provided between the intermediate cone 120 and the inner cone 126. The intermediate cone and the inner cone are secured to the second projection 111 on the nozzle block by a hollow nut member 134. The nut receives a flange 136 on the intermediate cone 120, which at the same time bears against the rear flange 130 of the inner cone. The nut 134, when tightened against the nozzle block, will secure the inner cone and intermediate cone in rigid, properly spaced relation. A plurality of passages 137 through the flanges 128 and 130 of the inner cone provide passage of gas and oxygen mixture from the mixing chamber 112 to the annular orifice 132. A second mixing chamber 138 is defined by the two flanges 128 and 130 and the inner and intermediate cones 126 and 120 respectively. This second mixing chamber 138 provides a better mix between the oxygen and gas for a more efficient flame at the orifice 132. An opening 140 through the center of the inner cone 126 communicates with the opening 114 in the nozzle block to allow passage of the solder wire therethrough.

The operation of the solder spray gun is as follows:

Air, gas and oxygen are fed to the valve block chambers 66, which chambers are blocked by the valve members 76. The pilot passage 84 may be opened slightly by the adjusting screws 86. The trigger 32 is depressed to open the valve members 76. The air, gas and oxygen will then flow through the passages 98, 100 and 102, depending on the sequence of the valve adjusting bolts 92. The sequence may be such that the gas and oxygen are fed to the nozzle tip before the air is passed to the chamber 124, for ease in lighting the mixture of gas and oxygen. When the nozzle is suitably preheated and the flame is at a proper melting temperature, the trigger 32 is further depressed to actuate the feed clutch 40 and the feed rolls 20. The solder is then fed through the nozzle block and the inner cone of the nozzle. At the nozzle tip the ignited gases melt the solder and the air passing through the annular orifice 122 sprays the melted solder on the workpiece. It may be seen that with an annular gas orifice the solder wire is evenly melted and with an annular air orifice the melted solder is evenly distributed to the adjacent workpiece.

I claim:

1. In a solder spray gun the combination of a nozzle, a nozzle block supporting said nozzle and having air, gas and oxygen passages therethrough, and a valve block having air, gas and oxygen inlet and outlet means formed therein and communicating with said passages respectively in said nozzle block; said nozzle having a first annular orifice therein communicating with said air passage in said nozzle block, a second annular orifice therein communicating with said gas and oxygen passages in said nozzle block, and mixing means in said nozzle and between said gas and oxygen passages in said nozzle block and said second annular orifice for mixing said gas and said oxygen in a burnable mixture; and said valve block having valve means between said inlet means and said outlet means to prevent the flow of fluid therethrough when closed, by-pass passages connecting said inlet means and said outlet means to allow fluid flow when said valve means are in a closed position, adjustable means in said by-pass passages to limit the flow of fluid therethrough, and adjustable means pivotally secured to said valve block to actuate said valve means and open the communication between said inlet and outlet means end allow fluid flow through said nozzle.

2. In a solder spray gun the combination of a nozzle, a nozzle block supporting said nozzle, and a valve block; said nozzle having an outer cone secured to said nozzle block, a nozzle tip secured in said outer cone, an intermediate cone concentrically disposed within said outer cone and said nozzle tip and radially spaced therefrom and defining a first annular orifice therebetween, said intermediate cone and said outer cone defining an annular air chamber therebetween, an inner cone concentrically disposed within said intermediate cone and radially spaced therefrom by a pair of annular flanges, said inner cone and said intermediate cone defining a second annular orifice therebetween and at the outward ends thereof, said flanges and said inner and intermediate cones defining a first annular mixing chamber therebetween, a plurality of gas passages through said flanges to allow flow of fluid therethrough, nut means securing said inner and intermediate cones to said nozzle block, and an axial passage through said inner cone to allow passage of solder therethrough; said nozzle block having a second annular mixing chamber formed therein adjacent one of said inner cone flanges and communicating with the passages formed therethrough, an air passage formed through said nozzle block and communicating with said air chamber between said outer and intermediate cones, a gas passage formed in said nozzle block and communicating with said mixing passage formed through said nozzle block and aligned and communicating with said axial passage in said inner cone for passage of solder therethrough; and said valve block having air, gas and oxygen inlet chambers formed therein, air, gas and oxygen inlet passages communicating with said respective chambers and said respective passages in said nozzle block, valve means between each of said chambers and said respective outlet passages, resilient means in each of said chambers and abutting said valve means associated therewith to bias said valve means in a chamber closing position, by-pass passages between each of said chambers and said outlet passages connected thereto to allow fluid flow therebetween when said valve means are in a chamber closing position, first adjustable means in each of said by-pass passages to limit the flow of fluid therethrough, and second adjustable means pivotally secured to said valve block and engaging said valve means to open said valve means and allow fluid flow from said chambers to said associated outlet passages and through said respective passages in said nozzle block and into said nozzle to be ignited to melt said solder passing through said nozzle block and said nozzle and spray said solder when melted onto an adjacent workpiece.

References Cited in the file of this patent

UNITED STATES PATENTS

| | | |
|---|---|---|
| 2,150,949 | Stevens | Mar. 21, 1939 |
| 2,227,753 | Ingham | Jan. 7, 1941 |
| 2,539,487 | Shepard | Jan. 30, 1951 |

FOREIGN PATENTS

| | | |
|---|---|---|
| 352,174 | Germany | Apr. 21, 1922 |
| 181,545 | Switzerland | July 16, 1936 |